United States Patent [19]

Hirs

[11] Patent Number: 5,549,823
[45] Date of Patent: Aug. 27, 1996

[54] SYSTEM FOR PURIFYING A SOLUBLE OIL EMULSION

[76] Inventor: Gene Hirs, 3822 W. 13 Mile Rd.#A4, Royal Oak, Mich. 48073

[21] Appl. No.: 386,687

[22] Filed: Feb. 10, 1995

Related U.S. Application Data

[63] Continuation-in-part of Ser. No. 267,872, Jun. 28, 1994, abandoned.

[51] Int. Cl.$^6$ ................................................ B01D 17/04
[52] U.S. Cl. .................. 210/265; 210/708; 210/776; 210/799; 210/804; 210/807; 210/167; 210/266; 210/290; 210/DIG. 5
[58] Field of Search ........................... 210/708, 799, 210/804, 807, 776, 167, 168, 265, 266, 283, 284, 290, DIG. 5, 248

[56] References Cited

U.S. PATENT DOCUMENTS

| | | | |
|---|---|---|---|
| 3,645,398 | 2/1972 | Fiocco | 210/DIG. 5 |
| 3,853,753 | 12/1974 | Jones | 210/DIG. 5 |
| 3,951,814 | 4/1976 | Krueger | 210/DIG. 5 |
| 4,411,791 | 10/1983 | Ward | 210/799 |
| 4,530,767 | 7/1985 | Hirs | 210/708 |
| 4,591,491 | 5/1986 | Sakai | 210/307 |
| 4,650,581 | 3/1987 | Angles et al. | 210/497.1 |
| 5,017,294 | 5/1991 | Dvrrieu | 210/708 |
| 5,411,665 | 5/1995 | Scraggs et al. | 210/799 |

Primary Examiner—Peter A. Hruskoci
Attorney, Agent, or Firm—Lymon R. Lyon

[57] ABSTRACT

A coalescer system (10) for oil-in-water soluble oil emulsions utilized as coolants and cutting oils for machining processes in industrial plants, comprises a deep bed of granular hydrophilic media particles (24) to effect coalescence of insoluble soaps and reverse phase water-in-oil droplets. The coalesced insoluble soaps and reverse phase emulsions flow to the liquid surface in tank (12) along with other contaminants that have an affinity for the reverse phase oil droplets and insoluble soaps, all in the form of floating waste (26). The waste (26) is then discarded. Effluent coolant may be transported back into the cooling system. The system (10) increases the stable life of the oil-in-water emulsion, minimizes the formation of foam, and removes other abrasive or otherwise harmful nonhomogeneous contaminants from the soluble oil emulsion.

1 Claim, 1 Drawing Sheet

SYSTEM FOR PURIFYING A SOLUBLE OIL EMULSION

CROSS-REFERENCE TO RELATED APPLICATIONS

This application is a continuation-in-part of U.S. patent application Ser. No. 08/267,872, filed Jun. 28, 1994, now abandoned, for an invention entitled, "Purification System for Coolants."

BACKGROUND OF THE INVENTION

The present invention relates generally to the purification of contaminated fluids used on high-production machining operations and more particularly to a system for coalescing and separating insoluble soaps and reverse phase emulsions from a soluble oil emulsion utilized as a cutting fluid in industrial operations.

Industrial machining processes or systems often generate excessive heat and friction during operation. Typically, a soluble oil is employed as a coolant and lubricant in such processes or systems in order to attenuate the amount of heat and friction generated, for example, during a cutting operation. Soluble oil is an oil-in-water emulsion in which water is the continuous phase and oil is the disperse phase. The oil droplets dispersed in the water average approximately 0.5 microns in size.

Soluble oil emulsions also require emulsifying agents, such as water-soluble soaps and detergents, which have a general structure of a hydrophobic paraffin chain terminating in a hydrophilic polar group. The emulsifying water-soluble soaps effectively stabilize the oil-in-water emulsions. More specifically, the hydrophobic paraffin chains concentrate in the oil droplets while the hydrophilic polar groups, which contain sodium or potassium cations, are oriented toward the continuous water phase. Because the sodium or potassium cations on the polar groups of the emulsifying soaps establish similar charges on the surface of the respective oil droplets, the oil droplets engage in a Brownian motion and repel each other. The emulsifying soaps therefore hold the oil droplets in a stable suspension in the water by preventing the oil droplets from coalescing.

In forming the emulsion, the water that is mixed with the neat soluble oil is typically a "hard" water and therefore contains impurities such as and calcium bicarbonate. In addition, other hard impurities such as raw, fine aluminum or iron containing particles become entrained in the emulsion during operation. The hard impurities are problematic because an undesirable ion exchange is often established which causes ions such as calcium from the hard impurities to displace the sodium and/or potassium ions in the emulsifying soaps. Initially, the oil droplets enter a transitional "partially spent" phase in which the emulsifying soaps contain some sodium ions and some calcium ions on the polar groups. In this "partially spent" transitional phase, the emulsifying soaps maintain positive charges on the polar groups and are still by and large effective in maintaining a stable emulsion.

However, the amount of hard impurities entering the soluble oil increases dramatically over time. In production operations, neat soluble oil is mixed with water in ratios generally ranging from about 10:1 to about 40:1, depending upon the amount of lubrication and/or cooling necessary for the operation. The concentration of hard impurities present in the water may range from approximately 50 ppm to as high as 400 or more ppm. Because the production operations generate heat, water must be continually added to the soluble oil to compensate for evaporation. Each time that water is added, the concentration of calcium-containing impurities in the soluble oil increases, and the aforementioned undesirable ion exchange becomes more frequent.

As the concentration of hard impurities in the soluble oil emulsion increases, some of the emulsifying soaps on the transitional phase oil droplets are rendered completely insoluble as more sodium ions on the polar groups are replaced by, for example, calcium ions. The presence of a water-insoluble emulsifying soap on the surface of an oil droplet causes the oil droplet to reverse into a water-in-oil emulsion because the inner portion of the droplet has a greater wetting power than that of the outer portion. Thus, water-insoluble soaps, such as calcium soaps, stabilize water-in-oil emulsions, as opposed to stabilizing the desired normal oil-in-water emulsions.

Contamination of the normal oil-in-water soluble oil by these insoluble soaps and reverse phase emulsions has heretofore been a large problem. More specifically, the reverse phase emulsions destroy the stability of the normal soluble oil emulsion. The reverse phase emulsions are attracted to the partially-spent-but-still-effective transitional oil droplets, thereby immobilizing the partially spent oil particles. In addition, where as the normal oil-in-water emulsion has very minimal attraction to air, the insoluble soaps and reverse phase emulsions are conversely greatly attracted to air, thereby creating a harmful foam on the surface of the soluble oil coolant. The foam engulfs solid particles, such as the aforementioned aluminum oxide, which are often abrasive and are difficult to remove from the soluble oil coolant because the foam prevents the solid particles from settling.

SUMMARY OF THE INVENTION

The aforesaid problems are solved, in accordance with the present invention, by a system for coalescing reverse phase water-in-oil droplets and insoluble soaps in an oil-in-water soluble oil utilized as a coolant and/or cutting fluid for machining processes. The coalescer system comprises a deep bed of hydrophilic media particles, such as small granular gravel pieces or granular black walnut shells. The bed creates a large surface area through which the coolant upwardly flows, thereby increasing the number of contacts and collisions among and between insoluble soap particles and reverse phase emulsion droplets. Because the insoluble soaps and the reverse phase emulsion droplets have a surface attraction among and between each other, the insoluble soaps and reverse phase emulsion droplets will coalesce and become buoyant. In addition, the hydrophilic media particles repel the reverse phase emulsion droplets and the insoluble soaps, thereby further enhancing merging and buoyancy of the insoluble soaps and the reverse phase emulsion droplets. Because the coalesced insoluble soaps and reverse phase emulsion droplets are buoyant, they float to the surface of the coalescer system where they can be separated from the oil-in-water soluble oil coolant and then discarded.

In addition to removing the reverse phase water-in-oil droplets and the insoluble soaps, the present invention advantageously removes other materials which are nonhomogeneous relative to the normal oil-in-water emulsion coolant, such as bacterial slimes, fungus, mineral oil, and metal-containing solid particles, such as aluminum oxide.

By removing the insoluble soaps, reverse phase emulsion droplets and other nonhomogeneous contaminants from the oil-in-water soluble oil coolant, the present invention reduces the wear and tear on machinery. In addition, the present invention dramatically increases the life of the soluble oil by minimizing harmful contaminants that would otherwise destroy the stability of the oil-in-water emulsion.

BRIEF DESCRIPTION OF THE DRAWING

The FIGURE is a diagrammatic representation of a coalescer system, in accordance with the present invention.

DETAILED DESCRIPTION OF THE PREFERRED EMBODIMENT(S)

Figure 1:
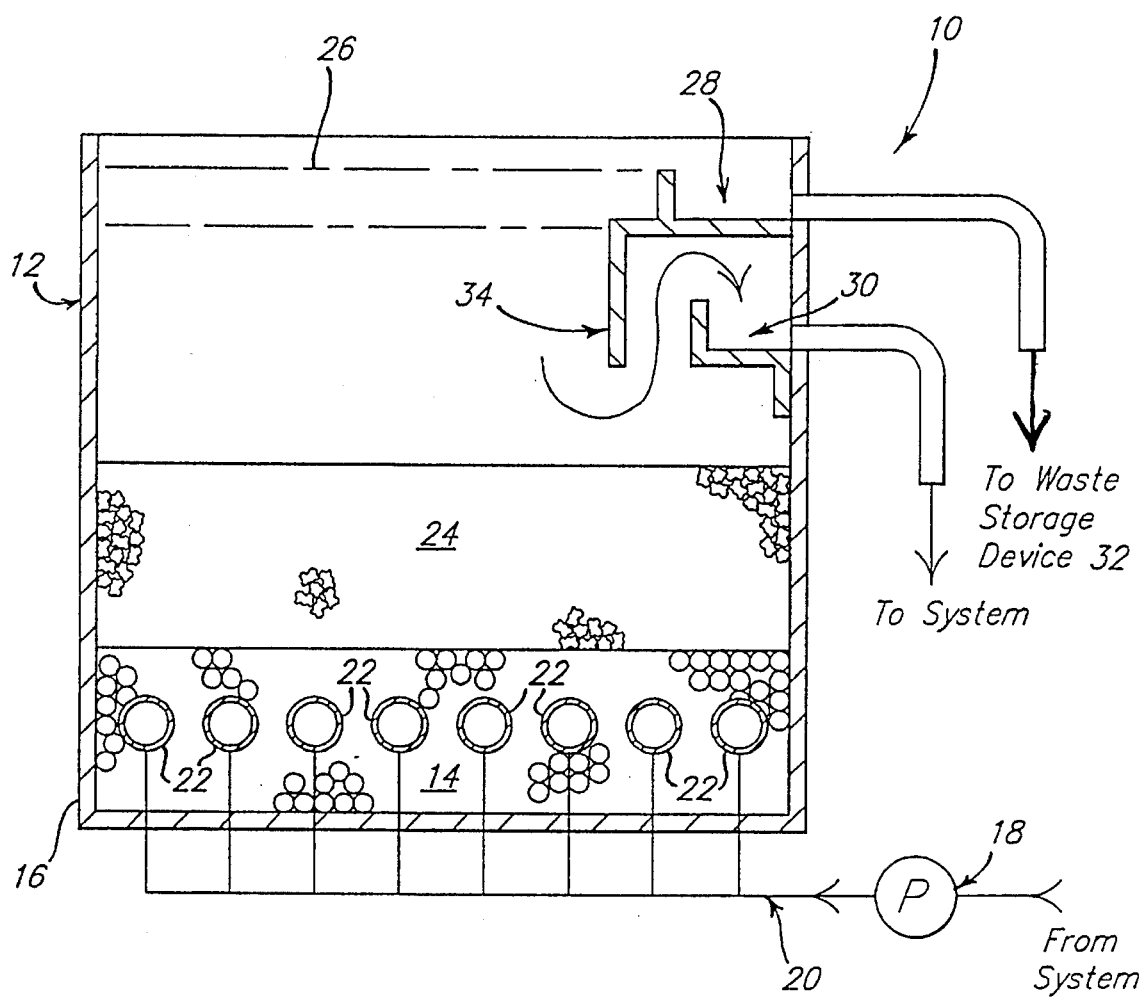

Referring to the FIGURE, a coalescer system 10 in accordance with the present invention comprises a tank 12 having base gravel 14 disposed in a lower portion 16 therein. A pump 18 facilitates the transport of a contaminated soluble oil emulsion used as a coolant for machining processes, into the lower portion 16 under high pressure. A contaminated fluid supply conduit 20 admits the coolant into the lower portion 16 through at least one, and preferably a plurality of outlet ducts 22. Each outlet duct 22 has a plurality of spaced apertures each having a diameter of, for example, 0.1875 inches (0.476 cm) for releasing the coolant into the lower portion 16, thereby effecting an upward flow of coolant.

The base gravel 14 in the lower portion 16 supports a deep bed of media particles 24. The gravel 14 facilitates entry of the contaminated coolant into the tank 12 without blockage because the gravel pieces are larger than the apertures in each perforated outlet duct 22. The larger gravel pieces therefore allow for smaller media particles 24 to be positioned thereon and above the perforated outlet ducts 22. One of ordinary skill in the art will readily appreciate that the media particles may be alternatively supported by a perforated plate, with the coolant released into a plenum absent the base gravel. Placing the media particles directly in the lower portion 16 of the tank 12 is a less desirable arrangement, but may also be utilized, particularly if media particles surrounding each perforated outlet duct 22 are larger than the apertures therein.

The media particles comprise highly hydrophilic and highly oleophobic media particles, including but not limited to granular materials such as small gravel pieces or various naturally occurring fruit pit shells or nut shells, most preferably granular black walnut shells. Each black walnut shell is preferably 8–12 mesh in size, and the bed is preferably 3–4 feet in height.

Following passage through the bed 24, effluent coolant may exit through a subsurface outlet port for transport, for example, back into a cooling system, or alternatively, into a primary or fine particle filter system. In an uppermost portion of the tank 12, a skimmer device, utilized to facilitate decantation of floating waste 26, is provided to coincide with a normal coolant surface level in the uppermost portion of the tank 12. The skimmer device is preferably constructed as a waste discharge weir 28, as shown in the figure. A subsurface effluent discharge weir 30 may be provided in communication with the subsurface outlet port in order to facilitate discharge of effluent coolant through the subsurface outlet port.

In operation, the bed 24 provides coalescence of undesirable insoluble soaps and reverse phase emulsion droplets from the coolant. More specifically, the coolant upwardly flows through a myriad of restrictions or interstices provided by the deep bed of media 24. These interstices facilitate collisions among and between insoluble soap particles and reverse phase emulsion particles by reducing the area wherein the coolant flows. Because the insoluble soap-particles and the reverse phase emulsion particles have a surface attraction among and between each other, the probability for a collision among and between the reverse phase emulsion particles and the insoluble soap particles is increased. As the coolant flows through the media bed, the distance among and between each insoluble soap particle and reverse phase emulsion droplets is further decreased as the hydrophilic media particles repel the insoluble soaps and reverse phase emulsion particles, thereby further increasing the number of contacts and combinations among and between insoluble soap particles and reverse phase emulsion droplets. The reverse phase emulsion droplets and the insoluble soaps have a surface attraction among and between each other, and if these particles collide, they will coalesce, grow in size, and become buoyant.

Thus, the present invention protects the stability of the oil-in-water soluble oil emulsion by joining the particles which form the insoluble soaps and reverse phase emulsions into increasingly larger particles. For example, if the average-sized reverse phase emulsion particle is increased from 0.5 microns to 5 microns, the diameter increases by ten times. Because volume is proportional to the cube of the diameter, 1000 particles are joined. The number of good oil-in-water droplets that are immobilized is dramatically decreased if these undesirable particles are joined into larger particles, which reduces the potential surface area for contacting and immobilizing the effective oil-in-water particles. Eventually, the coalesced undesirable particles are removed from the surface of coolant in the system 10 as described hereinbelow.

The insoluble soaps and reverse phase emulsion droplets also tend to form bubbles by attaching to ambient air in the system 10. As the insoluble soaps and reverse phase emulsion droplets coalesce, droplets of increasing size form, thereby enhancing the buoyancy of the insoluble soaps and reverse phase emulsion droplets.

In addition to the upward buoyancy vector, the upward flow of coolant itself facilitates the movement of the coalesced insoluble soaps and reverse phase emulsion particles toward the surface of coolant in tank. Waste 28 comprising insoluble soaps, reverse phase emulsion droplets, and other nonhomogenous contaminants as described hereinbelow, thus floats on the coolant surface in tank 12. The nonhomogenous contaminants are thus highly concentrated on the surface of coolant in tank 12.

In further accordance with the present invention, the system 10 removes other nonhomogeneous contaminants from the coolant, in addition to the reverse phase emulsions and the insoluble soaps. More specifically, the highly hydrophilic media further effect coalescence of mineral oil, which then also flows to the liquid surface and joins floating waste 26. The coalesced reverse phase emulsions, insoluble soaps and mineral oil also entrap other nonhomogeneous particles which have an attraction for the coalesced particles, such as bacterial slimes, fungus, and fine abrasive metal containing solid particles such as aluminum oxide. The removal of these fine abrasive metal-containing solid particles is particularly advantageous because they have been heretofore difficult to remove using a conventional filtering apparatus and are destructive to machinery.

In operation, the surface level of coolant in the tank must be normally maintained in an uppermost portion of the tank 12, in order for the floating waste 26 to be skimmed over the waste discharge weir 28. The waste 26 is then conveyed from the waste discharge weir 28 to a storage device 32, where the waste 26 can be discarded. In addition, the subsurface effluent discharge weir 30 is constructed with a barrier 34, for example an L-shaped barrier 34, which prevents waste 26 from entering the subsurface effluent discharge weir 30 and escaping from the outlet port into the cooling system. As an alternative to barrier 34, one of ordinary skill in the art will appreciate that a float valve may be utilized. While the preferred embodiment of the invention has been disclosed, it should be appreciated that the invention is susceptible of modification without departing from the scope of the following claims.

I claim:

1. A system for coalescing and removing reverse phase water-in-oil droplets and insoluble soaps from an oil-in-water oil emulsion comprising:

a tank for receiving the oil-in-water emulsion;

a gravel bed disposed in a lower portion of said tank, each particle of gravel having at least one dimension greater than a predetermined minimum;

a conduit extending into the gravel bed of said tank for introducing the oil-in-water emulsion thereinto, said conduit having a plurality of apertures with a maximum dimension less than the minimum dimension of the gravel particles in said bed;

a bed of media particles of 8 to 12 mesh in size disposed above said gravel bed, said media particles exhibiting both hydrophilic and oleophobic characteristics and forming a plurality of flow path interstices which effect mechanical coalescence of the water-in-oil droplets and insoluble soap into coalesced nonhomogeneous waste of sufficient buoyancy to float to the surface of the liquid in said tank through said interstices; a subsurface effluent discharge weir for removing liquid from said tank, wherein said weir includes a barrier to prevent said waste from entering said weir; and means for skimming and removing the coalesced nonhomogeneous waste from the surface of the liquid in said tank.

\* \* \* \* \*